US006629217B1

(12) United States Patent
Clohset et al.

(10) Patent No.: US 6,629,217 B1
(45) Date of Patent: Sep. 30, 2003

(54) METHOD AND APPARATUS FOR IMPROVING READ LATENCY FOR PROCESSOR TO SYSTEM MEMORY READ TRANSACTIONS

(75) Inventors: Steve J. Clohset, Sacramento, CA (US); Tuong P. Trieu, Folsom, CA (US); Wishwesh Gandhi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,653

(22) Filed: Dec. 22, 1999

(51) Int. Cl.$^7$ ............................................... G06F 12/16
(52) U.S. Cl. ...................................... 711/154; 711/163
(58) Field of Search ................................ 711/113, 146, 711/158, 163, 154; 710/53, 128, 107, 22, 108, 129; 714/43, 47

(56) References Cited

U.S. PATENT DOCUMENTS

| | | | | |
|---|---|---|---|---|
| 5,623,700 A | * | 4/1997 | Parks et al. ................... 710/53 |
| 5,822,772 A | * | 10/1998 | Chan et al. .................. 711/158 |
| 5,832,243 A | * | 11/1998 | Seeman ....................... 710/128 |
| 5,919,268 A | * | 7/1999 | McDonald .................... 714/47 |
| 5,923,857 A | * | 7/1999 | Pawlowski et al. .......... 710/107 |
| 5,940,864 A | * | 8/1999 | Arimilli et al. .............. 711/163 |
| 5,943,685 A | * | 8/1999 | Arimilli et al. .............. 711/146 |
| 5,946,708 A | * | 8/1999 | Fang et al. .................. 711/113 |
| 6,012,106 A | * | 1/2000 | Schumann et al. ........... 710/22 |
| 6,098,134 A | * | 8/2000 | Michels et al. .............. 710/108 |
| 6,205,506 B1 | * | 3/2001 | Richardson .................. 710/129 |
| 6,272,651 B1 | * | 8/2001 | Chin et al. ................... 714/43 |

* cited by examiner

*Primary Examiner*—David Hudspeth
*Assistant Examiner*—Fred F. Tzeng
(74) *Attorney, Agent, or Firm*—Calvin E. Wells

(57) ABSTRACT

A method and apparatus for improving read latency for processor to system memory read transactions is disclosed. One embodiment of a system logic device includes logic that assumes a transfer size of a predetermined length. In this manner, the system logic device can issue a read transaction request to system memory as soon as the read request address is delivered by the processor rather than waiting for the processor to deliver information indicating the transfer length. Once the actual transfer length information is delivered from the processor to the system logic device, the system logic device determines whether any of the data returned by the system memory needs to be purged before returning the requested data to the processor.

23 Claims, 4 Drawing Sheets

RECEIVE AN ADDRESS FOR A READ REQUEST FROM A PROCESSOR WHERE THE PROCESSOR DELIVERS THE ADDRESS IN ONE CLOCK PERIOD AND DELIVERS A LENGTH FOR THE READ REQUEST IN A SUBSEQUENT CLOCK PERIOD
110

ISSUE A READ REQUEST TO A SYSTEM MEMORY USING THE ADDRESS RECEIVED FROM THE PROCESSOR AND A PREDETERMINED READ REQUEST LENGTH
120

METHOD AND APPARATUS FOR IMPROVING READ LATENCY FOR PROCESSOR TO SYSTEM MEMORY READ TRANSACTIONS

FIELD OF THE INVENTION

The present invention pertains to the field of computer systems. More particularly, this invention pertains to the field of improving read performance for processor to system memory read transactions.

BACKGROUND OF THE INVENTION

Today's microprocessors continue to increase in processing power with every new generation of devices. In order to keep up with the increase in processing power of the processors and to avoid system bottlenecks, improvements must also be made to other subsystems within the computer system. One area where increased performance is desirable is the memory subsystem. In particular, it is desirable to improve the rate at which data can be retrieved by a processor from the computer system's main memory. One way to improve memory subsystem performance is to reduce the number of clock cycles it takes for a memory read cycle to complete once the read request is issued by the processor.

Many processors, including the Pentium® II and Pentium® III processors from Intel® Corporation, utilize a dual phase address when communicating with a system logic device where the system logic device includes a system memory interface. With dual phase addressing, an address for a read request is communicated to the system logic device in a first clock period while the length of the requested transfer is communicated in a second clock period. Prior system logic devices wait to receive both the address and the length information before the system logic device can issue a read request to the system memory. These prior system logic devices fail to take advantage of the fact that a large majority of read cycles to main memory have a length equal to that of a cacheline.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

A method and apparatus for improving read latency for processor to system memory read transactions is disclosed. One embodiment of a system logic device includes logic that assumes a transfer size of a predetermined length. In this manner, the system logic device can issue a read transaction request to system memory as soon as the read request address is delivered by the processor. Once the actual length information is delivered from the processor to the system logic device, the system logic device determines whether any of the data returned by the system memory needs to be purged. Because a large majority of read requests to system memory are expected to be cacheline reads, one embodiment assumes a length equal to that of a cacheline. If the processor actually requests less than a cacheline, the system logic device purges whatever data is not requested and delivers the requested data to the processor. By assuming a read transaction length of one cacheline, the system logic device can eliminate one clock period for many cacheline read cycles, which results in a significant improvement in memory subsystem performance.

Figure 1:
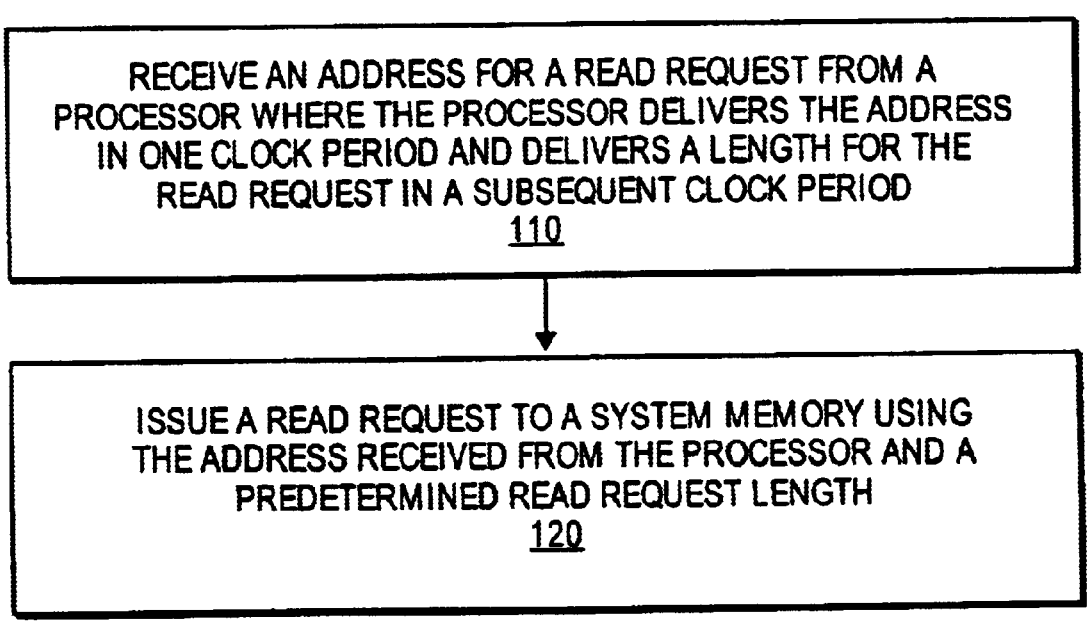
FIG. 1 is a flow diagram of an embodiment of a method for improving read latency for processor to system memory read transactions.

FIG. 1 is a flow diagram of an embodiment of a method for improving read latency for processor to system memory read transactions. At step 110, an address is received for a read request from a processor. The processor utilizes a protocol whereby it delivers the address in one clock period and subsequently delivers length information for the transfer in a second clock period. At step 120, a read request is issued to system memory using the address delivered by the processor and also using a predetermined read transaction length rather than waiting for the length information to be delivered by the processor. The predetermined length may be a cacheline, but other lengths are possible.

Figure 2:
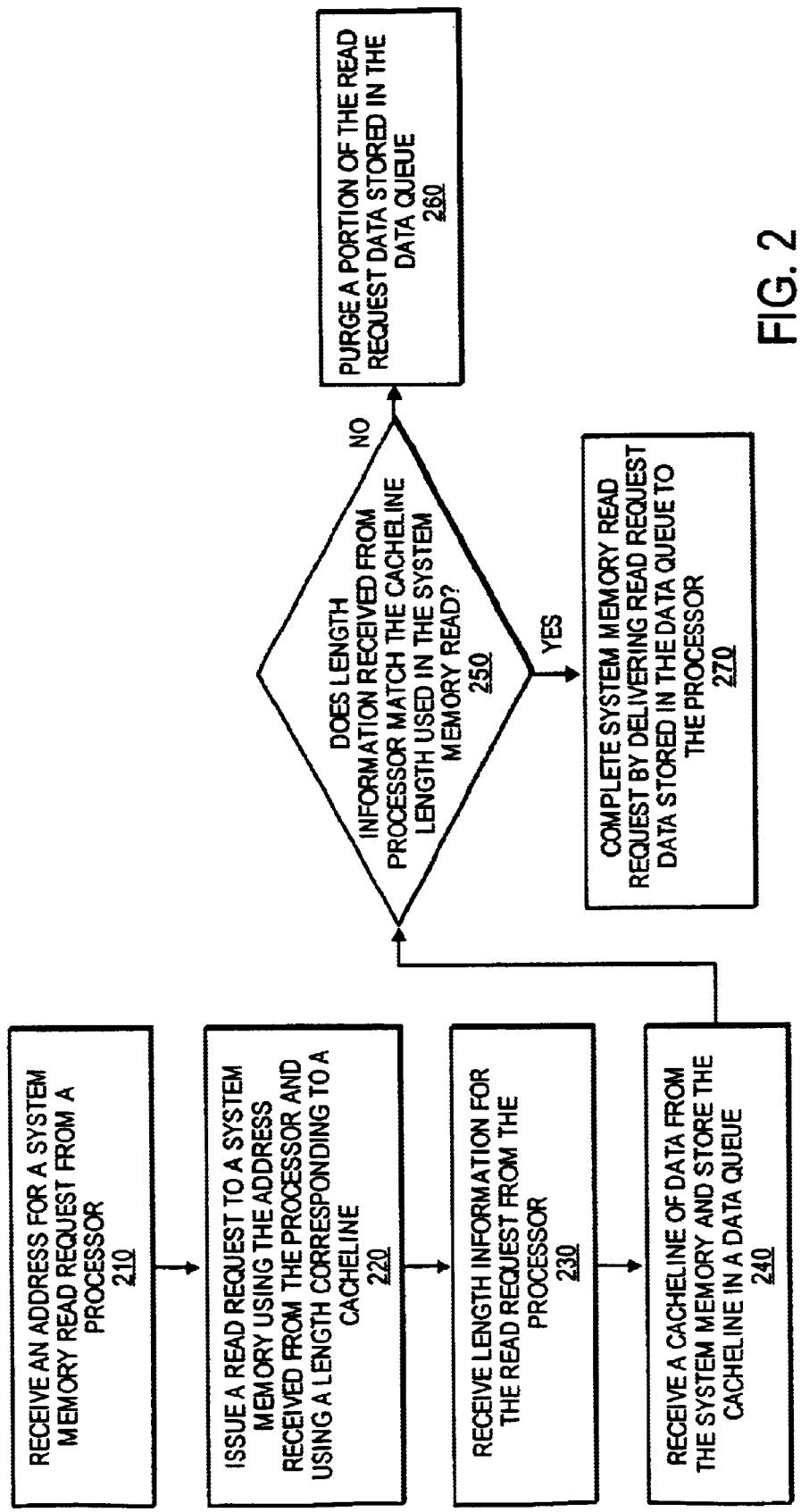
FIG. 2 is a flow diagram of an additional embodiment of a method for improving read latency for processor to system memory read transactions.

FIG. 2 is a flow diagram of an additional embodiment of a method for improving read latency for processor to system memory read transactions. At step 210, an address is received for a system memory read request from a processor. The processor utilizes a protocol whereby it delivers an address for the read request in one clock period and subsequently delivers length information for the transaction in a later clock period.

At step 220, a read request is issued to system memory using the address communicated by the processor and also using an assumed transaction length of one cacheline. Although this embodiment discusses a length of one cacheline, other assumed lengths are possible. For this example embodiment, a cacheline is 32 bytes in length.

The actual length information for the read request is received from the processor at step 230. In one embodiment, the length information is received in the clock period immediately following the clock period in which the address is received.

At some point following the issuance of the read request to the system memory using the address delivered by the processor and also using the assumed transaction length, the system memory returns a cacheline of data. The cacheline of data is received and stored in a data queue at step 240.

At step 250, a determination is made as to whether or not the actual transaction length information received from the processor matches the assumed transaction length used to retrieve data from the system memory. If the actual and assumed lengths do not match, then at step 260 a portion of the data stored in the data queue is purged. For one embodiment, the actual transaction length communicated by the processor is 0, 8, or 32 bytes. If the actual length for the read transaction communicated by the processor is 8 bytes, then 24 bytes are purged from the data queue. The term "purge" as used herein refers to any means or method of indicating that the purged data is not to be delivered to the processor. In one embodiment, the data is purged by manipulating a pointer in the data queue. Preferably, the purge operation is performed in single clock period. For the case where the actual length indicated by the processor is 0, 24 bytes are purged from the data queue and the remaining 8 bytes are later prevented from being delivered to the processor.

If at step 250 a determination is made that the actual transaction request indicated by the processor matches the assumed length of one cacheline, then none of the cacheline of data returned from system memory is purged from the data queue. Following steps 250 and 260, the system memory read request initiated by the processor is completed by delivering the data stored in the data queue to the processor at step 270.

Figure 3:
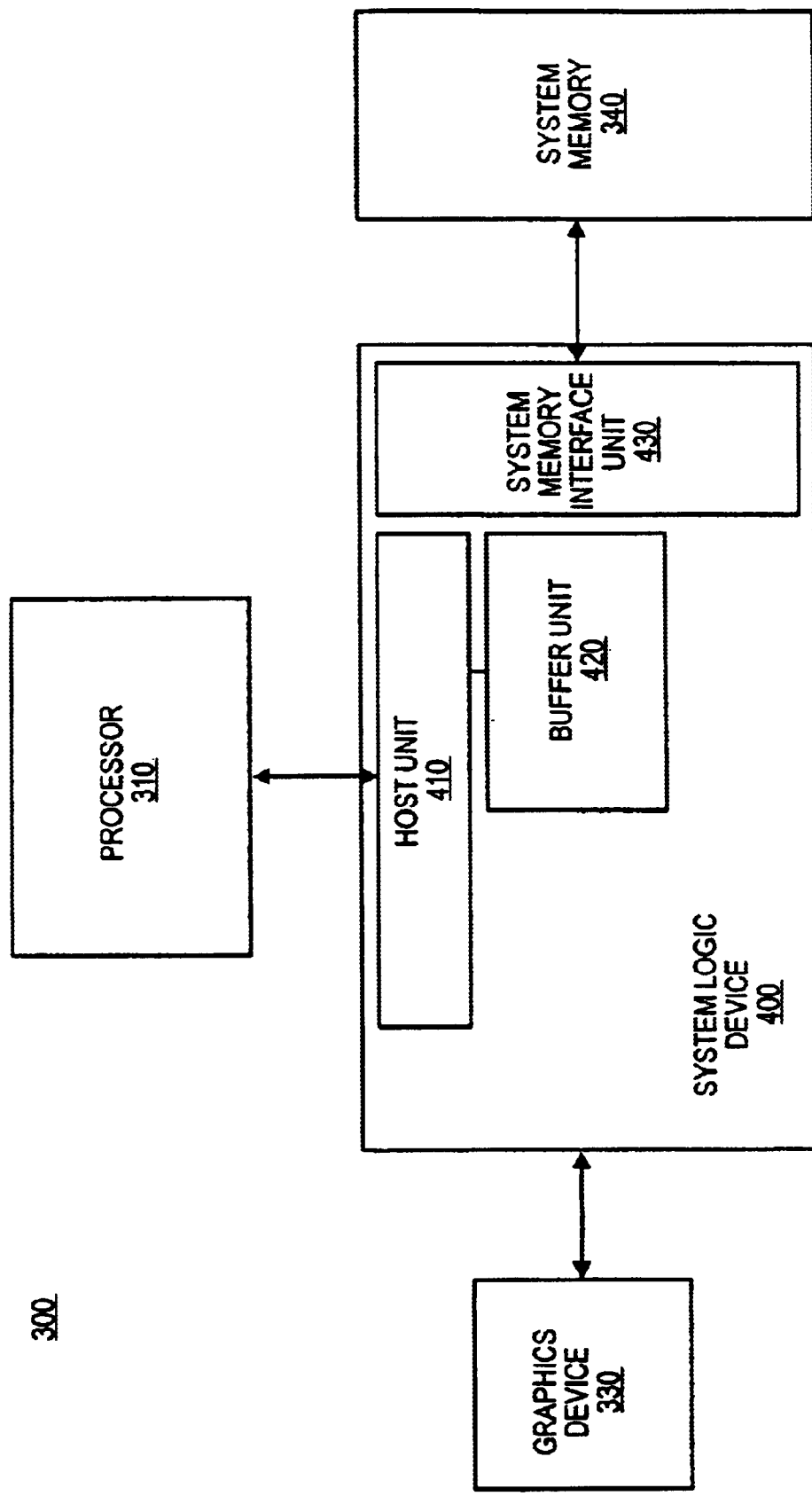
FIG. 3 is a block diagram of a computer system including a system logic device implemented in accordance with an embodiment of the invention.

FIG. 3 is a block diagram of a computer system 300 including a system logic device 400 implemented in accordance with an embodiment of the invention. The system 300 includes a processor 310 coupled to the system logic device 400. The system logic device 400 is coupled to a system memory 340 and a graphics device 330. Other system configurations are possible, including the graphics device 330 being incorporated into the system logic device 400.

The system logic device 400 includes a host unit 410, a buffer unit 420, and a system memory interface unit 430. The host unit allows communication with the processor 310 while the system memory interface unit 430 provides communication with the system memory 340. The buffer unit 420 provides data buffering between the host unit 410 and the system memory interface unit 430. The operation of the system logic device 400 is described in greater detail below in connection with FIG. 4.

Figure 4:
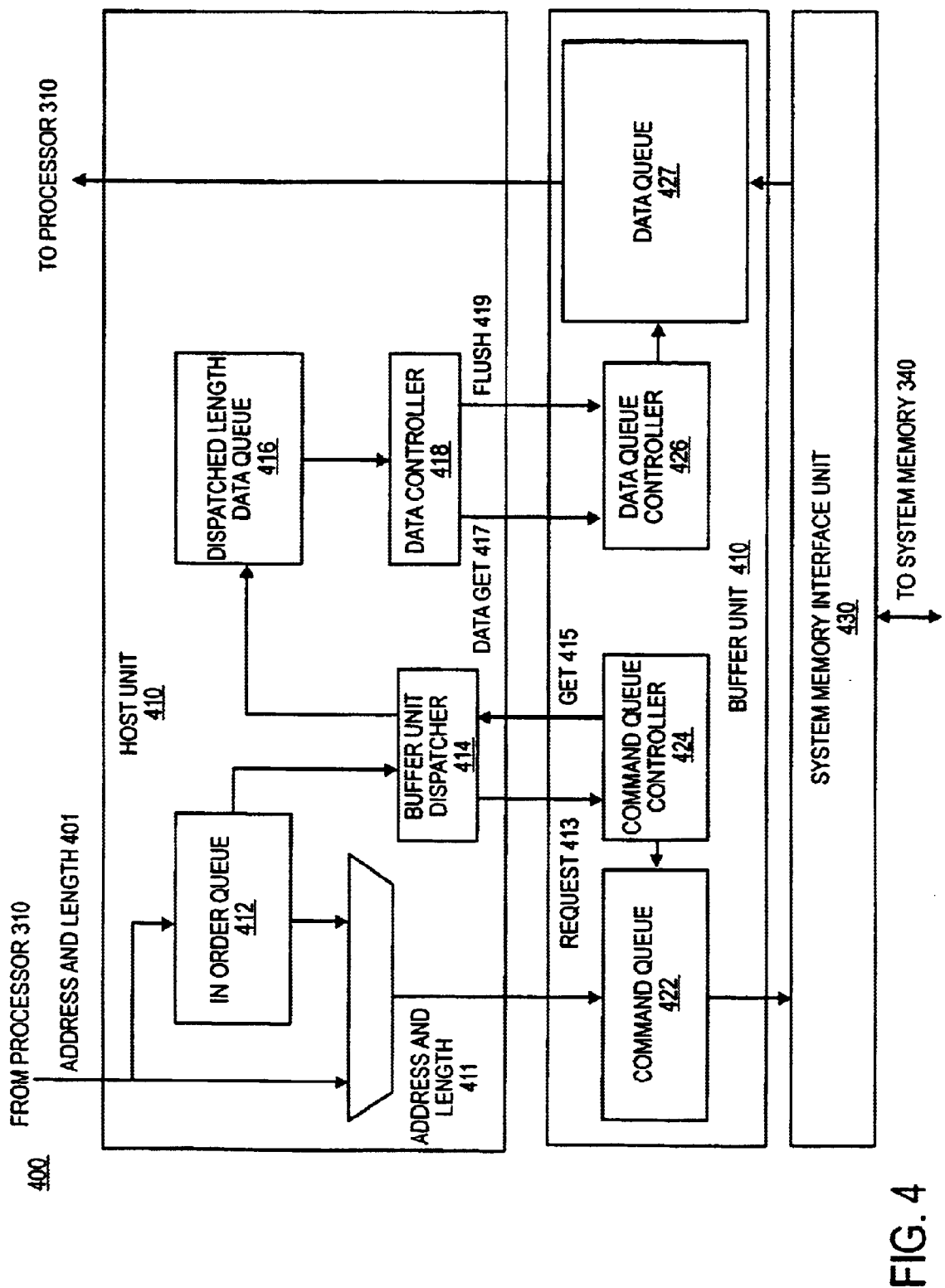
FIG. 4 is a block diagram of one embodiment of a system logic device that improves read latency for processor to system memory read transactions.

FIG. 4 is a block diagram of an embodiment of the system logic device 400 that improves read latency for processor to system memory read transactions. The system logic device 400 includes the host unit 410, the buffer unit 420, and the system memory interface unit 430. The host unit 410 receives address and length information 401 from the processor 310 for processor to system memory read requests and also returns requested data to the processor 310. The system memory interface unit 430 issues read requests to the system memory 340. The system memory interface unit 430 also receives return data for the read requests from the system memory 340. Also included in the system logic device 400 is the buffer unit 420. The buffer unit 420 serves to buffer data between the host unit 410 and the system memory interface unit 430.

Processor 310 begins a system memory read transaction by delivering an address to the system logic device 400 in a first clock period. Upon receiving the address from the processor 310, the host unit 410 checks to see whether an in order queue 412 is empty. The in order queue 412 stores outstanding requests received from the processor 310. If the in order queue 412 is not empty, then the host unit 410 stores the address delivered by the processor 310 and also stores a length for the read transaction delivered from the processor 310 to the system memory device 400 in a second clock period. The address and transaction length information may be delivered in contiguous clock periods.

If the in order queue 412 is empty or all requests stored in the in order queue 412 have already been dispatched to the buffer unit 420, then the address received in the first clock period is delivered to the command queue 422 in the buffer unit 420 as well as stored in the in order queue 412. The address is delivered to the command queue 422 without waiting for the processor 310 to deliver the transaction length information. Instead, a predetermined length is assumed by the system logic device 400. For this embodiment, the assumed length is 32 bytes, corresponding to one cacheline. Other assumed lengths are possible. The assumed length may be appended to the address information either in the host unit 410 or in the buffer unit 420.

A buffer unit dispatcher 414 indicates to a command queue controller 424 through the request signal 413 that a read request has been presented to the command queue 422. The get signal 415 indicates to the buffer unit dispatcher 414 when the command queue controller 424 accepts the presented read request. If the command queue 422 accepts the read request immediately after the read request is presented, then the assumed length of 32 bytes is used to issue a read request to the system memory interface unit 430. If, however, the command queue 422 does not immediately accept the presented read request, then the actual length information delivered by the processor 310 to the host unit 410 in the second clock period is used to issue the read request to the system memory interface unit 430. The buffer unit dispatcher 414 can know which of the assumed or actual length information is used for the read request by seeing when the get signal 415 is asserted. The get signal 415 for a read request using the actual length information is asserted at least one clock period later than if the assumed length information is used. The buffer unit dispatcher 414 also can check whether or not the actual length information matches the assumed length if the assumed length was used for the read request. The buffer unit dispatcher 414 communicates whether or not the actual and assumed length information matches to a dispatched length data queue 416.

After the system memory interface unit 430 issues the read request to the system memory 340, the system memory interface unit 430 receives return data for the read request from the system memory 340 and delivers the return data to a data queue 428 in the buffer unit 428.

A data controller 418 in the host unit 410 issues a get data signal 417 to a data queue controller 426 in the buffer unit 420 in order to cause the data queue 428 to deliver the read return data to the host unit 410 and from the host unit 410 to the processor. The data controller 418 can also issue a flush signal 419 that indicates to the data queue controller 426 to purge a portion of the read return data.

The data controller 418 receives information from the dispatched length data queue 416 regarding whether or not a purge operation is necessary. If the actual length indicated by the processor 310 is less than the assumed length of one cacheline, then a portion of the stored cacheline of read return data must be purged before returning data to the processor 310. For this embodiment, the processor issues read requests for either 0, 8, or 32 bytes of data. 32 bytes corresponds to one cacheline. If the actual length indicated by the processor is 8 or 0 bytes, then the data controller asserts the flush 419 signal. In response to receiving the flush signal 419, the data queue controller 426 purges 24 bytes of the 32 byte cacheline returned by the system memory 430. The first 8 bytes are delivered to the host unit 410. If the actual length is 8 bytes, then the host unit 410 returns the 8 bytes to the processor 310 and the read request is completed. In the case of a 0 byte length request, the host unit 410 purges the 8 bytes and no data is returned to the processor 310. If the actual length is indicated by the processor to be 32 bytes, then the flush signal 419 is not asserted and the entire cacheline is delivered to the host unit 410 and from there to the processor 310.

The data queue controller 426 performs the purge operation in this embodiment through manipulation of a pointer.

The flush operation may be accomplished in a single clock period. By performing the purge operation in a single clock period, subsequent read requests from the processor may proceed at full speed (no delay induced by the purge operation). As mentioned above in connection with FIG. 2, the term "purge" as used herein is meant to include any method or means for preventing the unwanted data from being delivered to the processor 310.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. A method, comprising:

receiving an address for a read request from a processor, the processor to deliver the address in one clock period and to deliver a length for the read request in a subsequent clock period; and issuing a read request to a system memory using the address received from the processor and a predetermined read request length rather than the length for the read request delivered by the processor.

2. The method of claim 1, wherein issuing a read request to a system memory using the address received from the processor and a predetermined read request includes a predetermined read request length of one cacheline.

3. The method of claim 2, further comprising:

receiving the length for the read request from the processor; and determining whether the received length matches the predetermined read request length.

4. The method of claim 3, further comprising:

receiving a cacheline of data from system memory; and storing the cacheline of data in a data queue.

5. The method of claim 4, further comprising purging a portion of the cacheline of data if the length received from the processor indicates a length of less than one cacheline.

6. The method of claim 5, wherein issuing a read request to a system memory using the address received from the processor and a predetermined read request includes using a predetermined read request length of one cacheline where the cachline has a length of 32 bytes.

7. The method of claim 6, wherein purging a portion of the cacheline of data if the length received from the processor indicates a length of less than one cacheline includes purging 24 bytes of the cacheline data.

8. The method of claim 7, wherein purging a portion of the cachline of data if the length received from the processor indicates a length of less than one cacheline includes performing the purge operation in a single clock period.

9. An apparatus, comprising:

a host unit to receive an address for a read request from a processor, the processor to deliver the address in one clock period and to deliver a length for the read request in a subsequent clock period; and a buffer unit to issue a read request to a system memory interface unit using the address received from the processor and a predetermined read request length rather that the length delivered by the processor.

10. The apparatus of claim 9, wherein the predetermined read request length is one cacheline.

11. The apparatus of claim 10, the host unit to receive the length for the read request from the processor and the host unit to determine whether the received length matches the predetermined read request length.

12. The apparatus of claim 11, the buffer unit to receive a cacheline of data from the system memory interface unit, the system memory interface unit to deliver the cacheline of data in response to the buffer unit issuing the read request using the address received from the processor and the predetermined read request length.

13. The apparatus of claim 12, the buffer unit to store the cacheline data delivered by the system memory interface unit in a data queue.

14. The apparatus of claim 13, the host unit to indicate to the buffer unit to purge a portion of the cacheline of data if the length received from the processor indicates a length of less than one cacheline.

15. The apparatus of claim 14, wherein the length of the cacheline is 32 bytes.

16. The apparatus of claim 15, the buffer unit to purge 24 bytes of the cacheline of data stored in the data queue in response to the host unit indicating to the buffer unit to purge a portion of the cacheline of data.

17. The apparatus of claim 16, the buffer unit to perform the purge operation in a single clock period.

18. The system of claim 9, wherein the predetermined read request length is one cacheline.

19. The system of claim 18, the host unit to receive the length for the read request from the processor and the host unit to determine whether the received length matches the predetermined read request length.

20. The system of claim 19, the buffer unit to receive a cacheline of data from the system memory interface unit, the system memory to deliver the cacheline of data to the system memory interface unit in response to the buffer unit issuing the read request to the system memory interface unit using the address received from the processor and the predetermined read request length.

21. The system of claim 20, the buffer unit to store the cacheline data delivered by the system memory interface unit in a data queue.

22. The system of claim 21, the host unit to indicate to the buffer unit to purge a portion of the cacheline of data if the length received from the processor indicates a length of less than one cacheline.

23. A system, including:

a processor;

a system memory; and a system logic device coupled between the processor and the system memory, the system logic device including a host unit to receive an address for a read request from the processor, the processor to deliver the address in one clock period and to deliver a length for the read request in a subsequent clock period, and a buffer unit to issue a read request to a system memory interface unit using the address received from the processor and a predetermined read request length rather than the length delivered by the processor, the system memory interface coupled to the system memory.

* * * * *